United States Patent [19]

Suga

[11] Patent Number: 4,620,792

[45] Date of Patent: Nov. 4, 1986

[54] METHOD OF SIMPLY SETTING EXPANSION REGIONS FOR CONVERSION OF VALUES OF COLORS ACCORDING TO XYZ NOTATION SYSTEM INTO VALUES OF COLORS ACCORDING TO MUNSELL NOTATION SYSTEM

[76] Inventor: Nagaichi Suga, 3-8, Toyama, 1-chome, Shinjuku-ku, Tokyo, Japan

[21] Appl. No.: 597,822

[22] Filed: Apr. 6, 1984

[51] Int. Cl.$^4$ .............................................. G01T 3/52
[52] U.S. Cl. .................................... 356/402; 364/526
[58] Field of Search ........................ 356/402, 405–406; 364/526, 577

[56] References Cited

PUBLICATIONS

Harris et al, "Color Technology and Its Applications in Industry," Diano Corporation, 1970, pp. 11–18.
Wright, "The Measurement of Color," 4th edition, 1969, Adam Hilger Ltd., pp. 168–169 & pp. 183–193.
Billmeyer et al, "Principals of Color Technology", 2nd edition, 1981 John Wiley & Sons, Inc. pp. 40–61.

*Primary Examiner*—Vincent P. McGraw
*Assistant Examiner*—Robert D. V. Thompson, III
*Attorney, Agent, or Firm*—Wenderoth, Lind & Ponack

[57] ABSTRACT

A method of expanding the regions in which conversion of color values in the CIE notation system to values in the Munsell notation system can be made. On a conventional Munsell chromaticity diagram having equi-hue lines and equi-chroma loci and superimposed on a CIE set of coordinates in a conventional conversion diagram, the respective equi-hue lines are extended outwardly from the outermost equi-chroma locus in a direction in alignment with respective lines connecting the respective intersections of the outermost equi-chroma locus with the respective equi-hue lines and the intersections of the next inward equi-chroma locus with the respective equi-hue lines, the extension being to points along the extended equi-hue lines which are integral multiples of a value d which is equal to $\sqrt{(x_1-x_2)^2+(y_1-y_2)^2}$ where $x_1$ and $y_1$ are the CIE notation values of the points of intersection of the respective equi-hue lines and the outermost equi-chroma locus, and $x_2$ and $y_2$ are the CIE notation values of the points of intersection of the respective equi-hue lines and the next inward equi-chroma locus. The points along the extended equi-hue lines are joined with corresponding points on adjacent equi-hue lines to form further equi-chroma loci outwardly of the outermost equi-chroma locus.

1 Claim, 7 Drawing Figures

4,620,792

METHOD OF SIMPLY SETTING EXPANSION REGIONS FOR CONVERSION OF VALUES OF COLORS ACCORDING TO XYZ NOTATION SYSTEM INTO VALUES OF COLORS ACCORDING TO MUNSELL NOTATION SYSTEM

This invention relates to converting values which numerically express a color from the so-called CIE notation system to the Munsell notation system, and more particularly to a method of expanding the regions in which conversion of values can be made to ranges outside those covered by existing tables and diagrams of correlated values of the CIE notation system and the Munsell system.

BACKGROUND OF THE INVENTION AND PRIOR ART

It is widely accepted that the Munsell notation system of numerical values for designating a color is a most excellent system for expressing the color of an object because of the high correspondence of the values according to the Munsell system and the luminosity of the color of the object. However, it is not very easy to convert the tristimulus values X, Y and Z according to the CIE notation system, which are calculated on the basis of a colorimetric value, into a value according to the Munsell notation system.

The Optical Society of America considered the relation between the values according to the CIE notation system and the values according to the Munsell notation system, and in 1943 proposed a revised Munsell notation system, known as the Munsell Renotation System, but hereinafter referred to simply as the Munsell notation system. According to this system, the relation between the visual reflection power Y(%) and Munsell lightness V is determined by using a quinary formula experimentarily obtained. For the conversion of the chromaticity values according to the CIE notation system, an equi-hue locus and an equi-chroma locus must be found on a chromaticity-Munsell notation conversion diagram, which is a CIE 193 (x, y)—chromaticity diagram corresponding to Munsell lightness value V close to the value V for the particular color as converted from the CIE notation system, and which has Munsell equi-hue lines and equi-chroma loci superimposed therein, from which the Munsell values for hue and chroma as marked on the diagram can be determined.

This conversion process is described in ASTM Designation D 1535-80 Standard Method of SPECIFYING COLOR BY THE MUNSELL SYSTEM. Using this process, it is fundamentally possible to convert a value according to the CIE notation system into a value according to the Munsell notation system.

However, the relation between a value according to the CIE notation system and a value according to the Munsell notation system can be expressed by a numerical formula only for the relation between the visual reflection power Y and the Munsell lightness V. Therefore, in order to convert a value according to the Munsell notation system, it is necessary to carry out the troublesome steps of using the chromaticity-Munsell notation conversion diagrams.

For this reason it is thought that the values according to the Munsell notation system have not been widely utilized, although they have a high correspondency to the luminosity of colors.

Recently, however, the complexity of the conversion because of the necessity of using the chromaticity-Munsell notation conversion diagrams have been overcome by the utilization of computers, so that it has become possible to carry out the conversion very easily and speedily. Therefore, it is possible that the Munsell notation system will be utilized to a greater extent in the future.

However, the tables of numerical values representing the relation between the values of visual reflection power according to the CIE notation system and the lightness values according to the Munsell notation system and the chromaticity-Munsell notation conversion diagrams proposed by the Optical Society of America do not fully cover the whole range of colors of objects. They cover only a limited range of colors of objects. This has been an obstacle to the utilization of the values according to the Munsell notation system.

The values according to the CIE notation system of certain colors, especially those having high visibilities, are substantially incapable of being converted into values according to the Munsell notation system by the system presently available.

The above drawbacks of the Munsell notation system have not heretofore posed any big problems. This may be due to the fact that the Munsell notation system has not been utilized very much in practice.

There has also been developed a new color-expressing notation system for colored materials, namely the HC*B* system, which is based on and is derived from the Munsell notation system.

In the HC*B* notation system, the values designating colors are determined on the basis of hue H, lightness V and chroma C according to the Munsell notation system, and the system is described in Japanese Patent Application No. 205282/1981, "Apparatus for Measuring and Displaying Values C* of Density and Degrees of Fastness of Colors".

In order to be able to make sufficient use of not only the values according to the Munsell notation system but also those according to the HC*B* notation system, it is very inconvenient that regions in the range of colors exist in which it is substantially not possible to convert, by the system presently available, values according to the CIE notation system of colors of objects into values according to the Munsell notation system.

OBJECTS AND BRIEF SUMMARY OF INVENTION

It is accordingly an object of the invention to provide a method of obtaining Munsell notation system values for colors outside the range of colors presently included in conventional tables and chromaticity diagrams for conversion from the CIE notation system and the Munsell notation system.

The method which achieves this object according to the invention comprises the steps of, on a conventional Munsell chromaticity diagram having equi-hue lines and equi-chroma loci and superimposed on a CIE set of coordinates in a conventional conversion diagram, extending the respective equi-hue lines outwardly from the outermost equi-chroma locus in a direction in alignment with respective lines connecting the respective intersections of the outermost equi-chroma locus with the respective equi-hue lines and the intersections of the next inward equi-chroma locus with the respective equi-hue lines, the extension being to points along the extended equi-hue lines which are integral multiples of a value d which is equal to $\sqrt{(x_1-x_2)^2+(y_1-y_2)^2}$ where $x_1$ and $y_1$ are the CIE notation values of the points of intersection of the respective equi-hue lines and the outermost equi-chroma locus, and $x_2$ and $y_2$ are the CIE notation values of the points of intersection of the respective equi-hue lines and the next inward equi-chroma locus; and joining the points along the extended equi-hue lines with corresponding points on adjacent equi-hue lines to form further equi-chroma loci outwardly of the said outermost equi-chroma locus.

BRIEF DESCRIPTION OF THE DRAWINGS

The invention will now be described in greater detail in connection with the accompanying drawings, in which.

DETAILED DESCRIPTION OF THE INVENTION

In order to obtain Munsell values for ranges of colors beyond the conventional conversion tables and diagrams, the equi-hue lines on the existing conventional x, y-chromaticity diagrams must be extended and equi-chroma loci beyond the equichroma loci in the existing conventional chromaticity conversion diagrams must be provided. However, it is not easy to extend these lines and provide these loci in accordance with the uniformity in perception with respect to a hue and a chroma as determined by the Optical Society of America. Therefore, an approximate extension of the equi-hue lines and the provision of approximate equichroma loci are carried out by a simple method.

Figure 1:
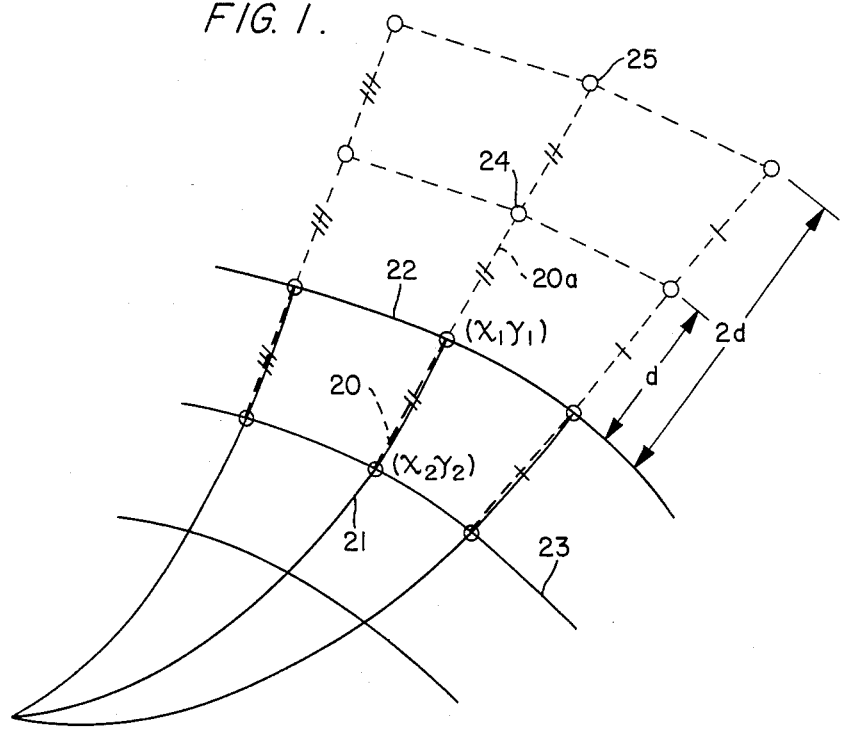
FIG. 1 is a diagram of part of a chromaticity diagram illustrating the principle of the expansion of the diagram according to the method of the invention.

To this end, as shown in FIG. 1, a straight line 20 connecting the outermost intersecting points $x_1$ and $y_1$ between an equi-hue line 21 and an equi-chroma locus 22 and the second outermost intersecting points $x_2$ and $y_2$ of the equi-hue line 21 and the next inward equi-chroma locus 23 spaced from each other a distance corresponding to two chromas along the equi-hue lines 21 on a conventional x, y-chromaticity-Munsell notation conversion diagram is extended outward as shown at 20a. Two points 24 and 25 which are spaced outwardly from the point $x_1$, $y_1$ by a distance $d = \sqrt{(x_1-x_2)^2+(y_1-y_2)^2}$, and a distance 2d, respectively, are marked on the resulting extended line. These points are connected to corresponding points on extended lines of equi-hue lines on opposite sides of the first-mentioned equi-hue line to form an expanded region of the conversion diagram.

Figure 2A:
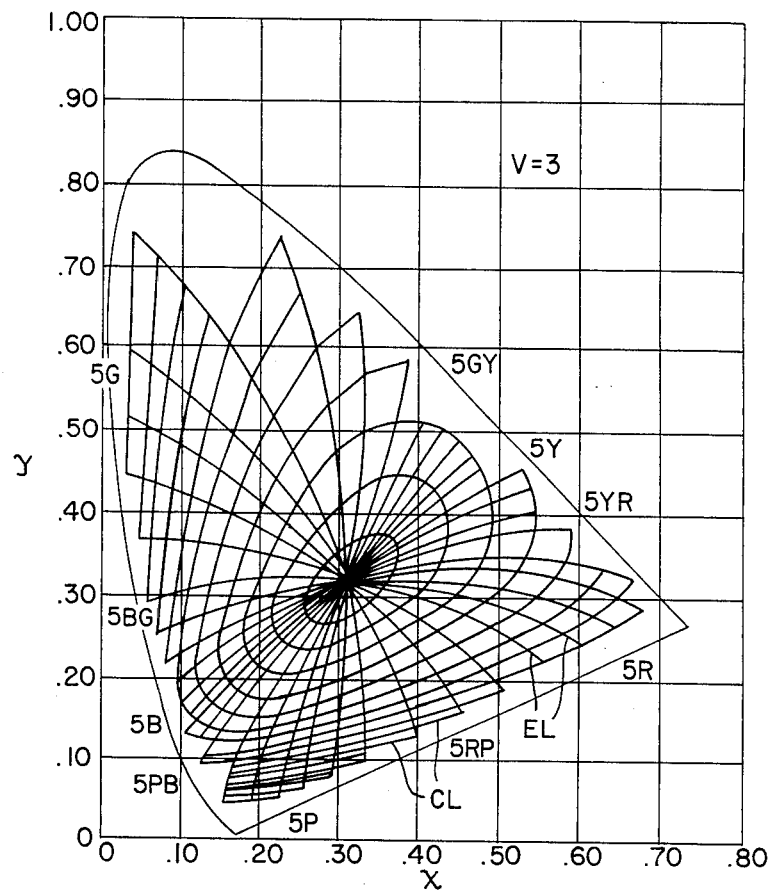
FIGS. 2a and 3a are conventional chromaticity-Munsell notation conversion diagrams for Munsell lightness values V=3 and V=4.
Figure 2B:
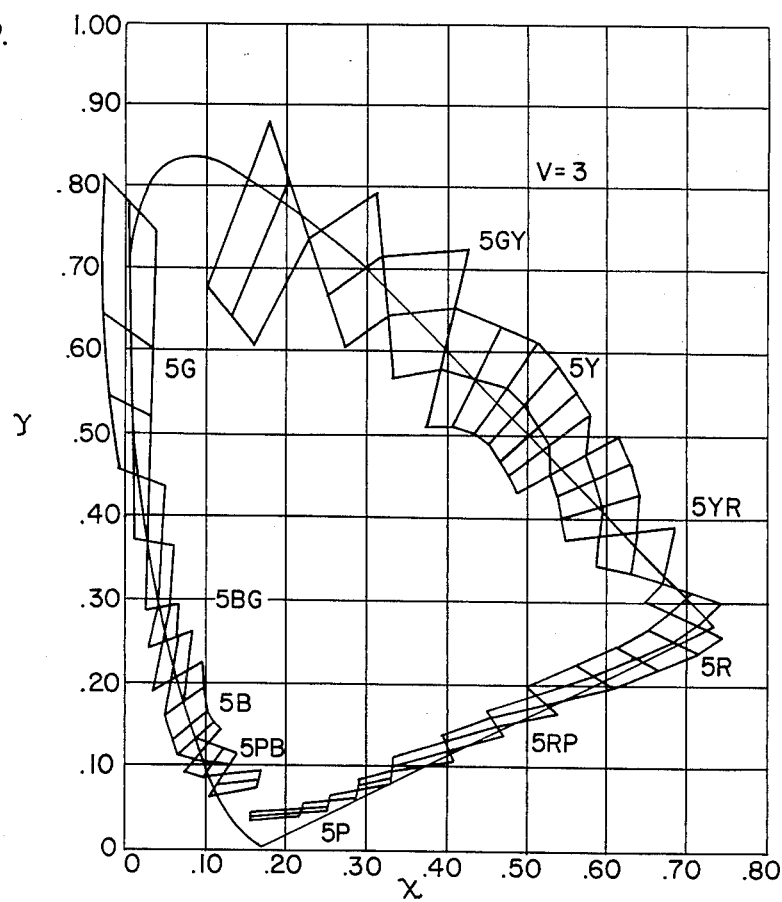
FIGS. 2b and 3b are expanded regions of the diagrams of FIGS. 2a and 3a obtained by the method of the present invention.
Figure 3A:
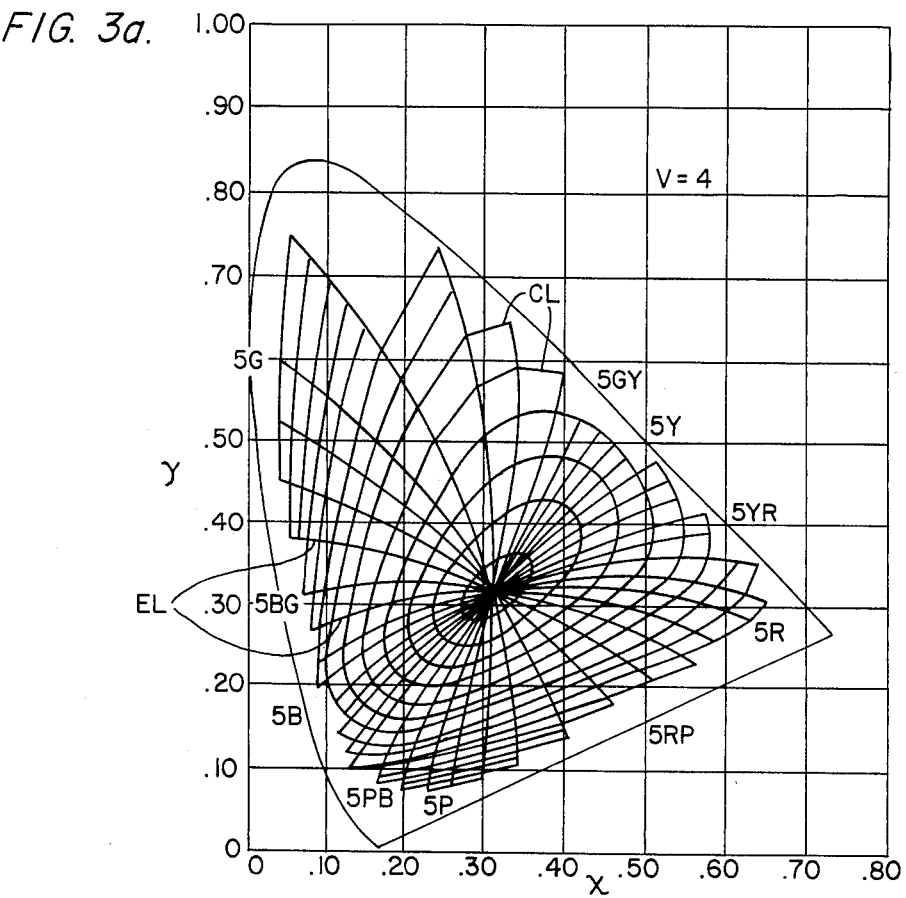
Figure 3B:
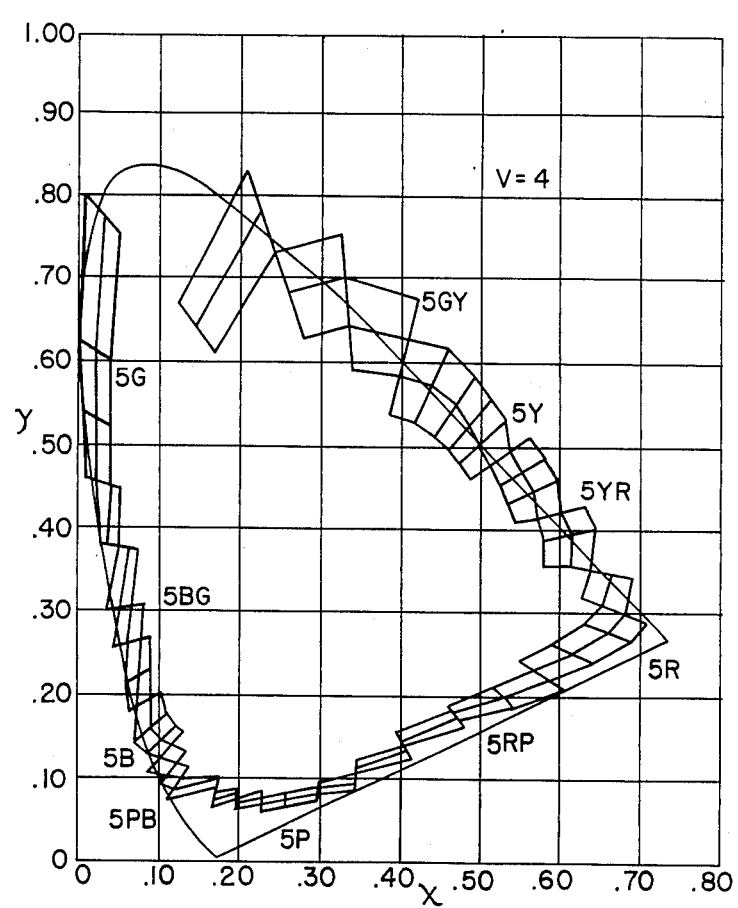

The relation between the values according to the CIE notation system in the expanded region formed by the above-described method and values according to the Munsell notation system can, in addition to being derived from the conversion diagrams, be set forth in tabular form, as shown in Table 1. Examples of the regions of the known conversion diagrams and newly formed expanded regions formed according to the present invention are shown in FIGS. 2a and 2b and 3a and 3b. In these figures, the Munsell chromaticity diagrams, or parts thereof, with their equi-hue lines generally indicated at EL and chroma loci CL are superimposed on the x, y coordinates of the CIE diagram. FIGS. 2a and 3a show regions which have already been established for Munsell lightness values V=3 and V=4, and FIGS. 2b and 3b show the expanded regions for these values of V prepared according to the present invention.

In this simple expansion method according to this invention, an uncomplicated, linear expansion operation using only the outermost and second outermost intersecting points is carried out. It is conceivable, of course, that a more exact and scientific expansion method utilizing all of the tables of already known numerical values could be employed. Both of these types of expansion methods are mathematic expansion methods, which may not correspond exactly with experimental results. However, an object of the expansion operation according to the present invention is to make it possible to obtain substantially accurate values according to the Munsell notation system which correspond to values according to the CIE notation system which heretofore could not be converted into values according to the Munsell notation system. It is considered that the results obtained by the simple expansion method according to the present invention and those obtained by a more exact method will not differ very greatly.

Even if a more strict mathematic expansion system, or an expansion system based on sufficient psychological experiments is employed in the future, the tables of numerical values obtained according to the present simple method will not be required to be corrected very much. Consequently, it is believed that the values according to the CIE notation system which lie outside known conversion tables and diagrams can be converted into sufficiently accurate values according to the Munsell notation system by conversion diagrams as shown in FIGS. 2b and 3b and tables similar to Table 1 showing the relation between the values in the two notation systems obtained according to the present method.

An example of the conversion of values according to the CIE notation system into values according to the Munsell notation system using expanded conversion diagrams prepared according to the method according to the present invention will now be described with reference to a specific color for which values according to the CIE notation system which could not heretofore be converted into values according to the Munsell notation system, are converted into such values.

Values according to the CIE notation system, X=18.87, Y=9.56, Z=0.91, which represent bright red, are converted into values according to the Munsell notation system as follows. (1) The chromaticity coordinates x, y are calculated from the XYZ values as follows:

$$x = \frac{X}{X+Y+Z} = 0.6431 \quad y = \frac{Y}{X+Y+Z} = 0.3258$$

Figure 4:
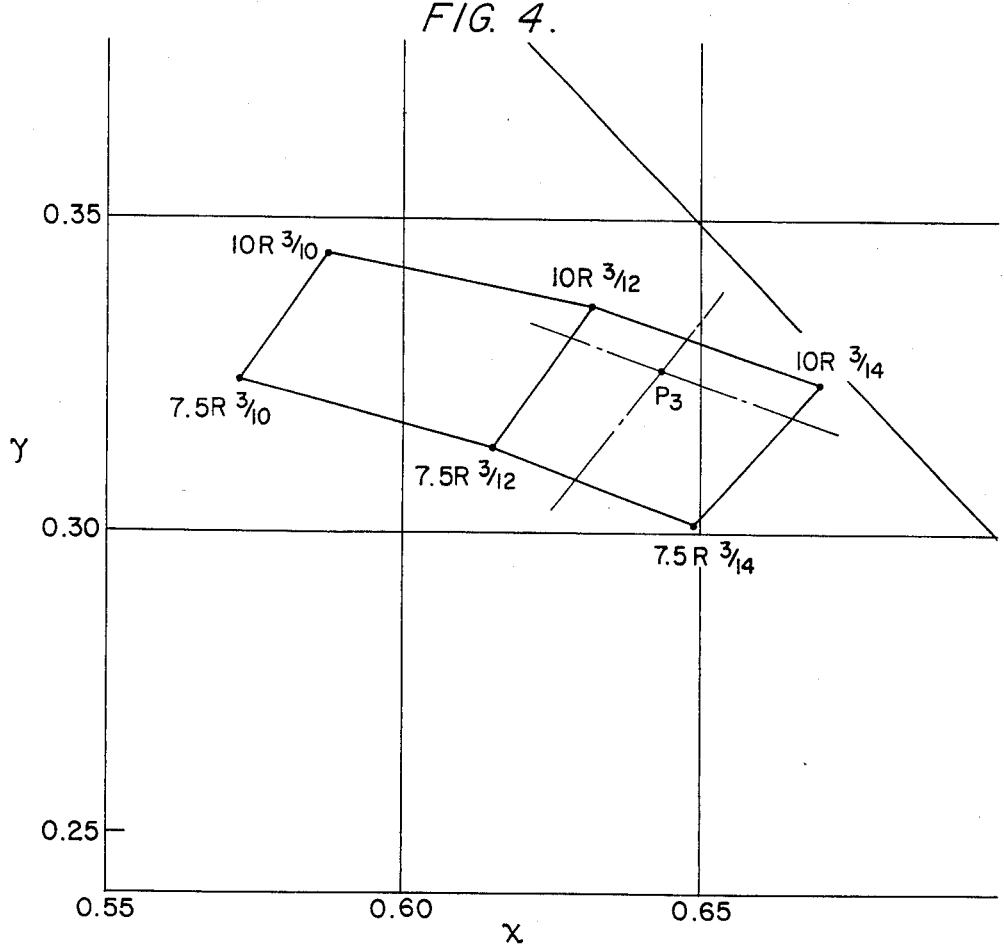
FIG. 4 is an enlarged part of the diagram of FIG. 2.

(2) The Munsell lightness V is determined from the value of Y. The Munsell lightness V can be obtained from the Y-V tables of JIS (Japan Industrial Standard Z8721, or can be determined by carrying out a computation in accordance with the known formula expressing the relation between Y and V, as follows:

$Y=1.2219V-0.23111V^2+0.23951V^3-0.021009V^4+0.0008404V^5$ $V=3.6$ corresponding to $Y=9.56$ is obtained by either method. (3) Since the lightness V is 3.60, the hues H and chromas C are read from the conversion diagrams for values $V=3$ and $V=4$, and an interpolation corresponding to 0.6 lightness value is carried out with respect to the hue and chroma as described in ASTM Designation D1535-80 to obtain values according to the Munsell notation system. (4) Using the conversion diagram for $V=3$, point (x, y) as determined in paragraph (1) above is plotted as $P_3$ in FIG. 4, which is an enlarged part of FIG. 2a. FIG. 2a can be used since $P_3$ lies within the known conversion diagram. Interpolation is carried out on the basis of the four values according to the Munsell notation system of the intersections around $P_3$, i.e. 10R 3/12, 10R 3/14, 7.5R 3/12, 7.5R 3/14, by which the following results are obtained:

Hue: 9.3R, Chroma: 12.8

Figure 5:
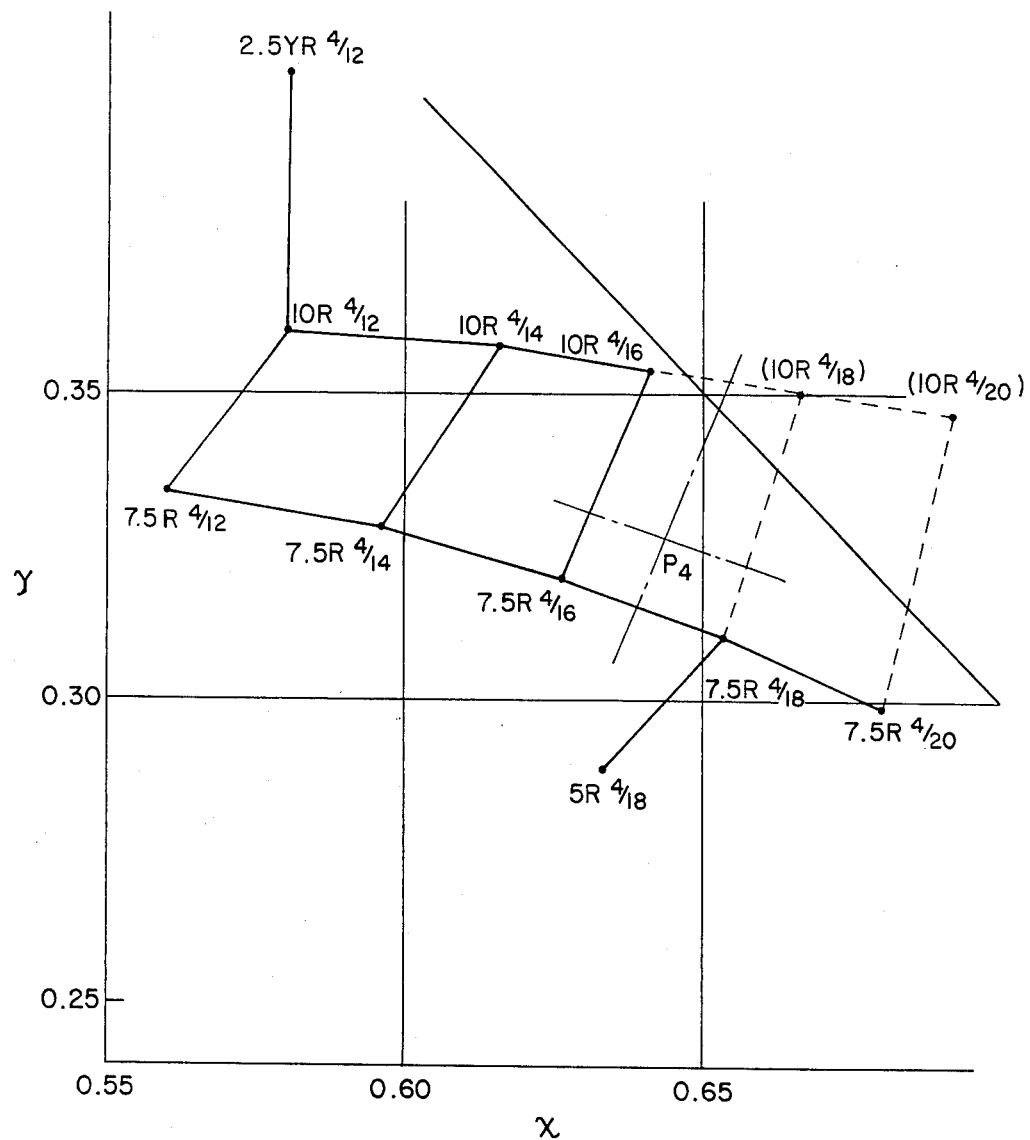
FIG. 5 is an enlarged part of the diagram of FIG. 3b.

Value according to the Munsell notation system: 9/3R 3/12. (5) Using the conversion diagram for $V=4$, an attempt is made to plot point (x, y) as determined in paragraph (1) above as $P_4$ in FIG. 5, which is an enlarged part of FIG. 3a and including an expanded part from FIG. 3b. The points having known hues and chromas are included within the regions below and to the left of the solid lines, and $P_4$ cannot be located in these regions so as to be surrounded by four known values in the Munsell notation system. Therefore, if only the conventional conversion diagram is used, the hue and chroma values in the Munsell notation system corresponding to the point $P_4$ cannot be obtained. When the conversion diagram is expanded according to the present invention, the Munsell notation system values in the regions within the broken lines in FIG. 5 can be obtained. Interpolation operations are carried out using the four values according to the Munsell notation system, i.e. 10R 4/16, 10R 4/18, 7.5R 4/16, 7.5R 4/18, which surround the point $P_4$, to obtain the following results.

Hue: 8.3R, Chroma: 17.0

Value according to the Munsell notation system: 8.3R 4/17.0 (6) Interpolation of hue and chroma values in the Munsell notation system for the lightness values 3 and 4 is carried out according to the technique of ASTM Designation D1535-80 to obtain hue and chroma values for the lightness of 3.6, and the following results are obtained.

Hue: $9.3R+0.6(8.3R-9.3R)=8.7R$

Chroma: $12.8+0.6(17.0-12.8)\div15.3$

The values for the color of this example according to the Munsell notation system are:

Hue: 8.7R, Lightness: 3.6, Chroma: 15.3 (i.e. Munsell 8.7R 3.6/15.3).

As described above, the values of colors according to the CIE notation system which are outside the range of the known conversion diagrams, cannot, without more, be converted into values according to the Munsell notation system. When the expansion method according to the present invention is used, the above drawback can be eliminated, i.e. the values according to the Munsell notation system for colors in any region can be obtained.

In the above Example of the present invention, the procedure for converting values according to the CIE notation system into values according the Munsell notation system by using the conversion diagrams and making calculations with figures written down on paper is described. For carrying out such a conversion in actual practice, a computer is preferably used to shorten the calculation time and save labor. In such a case, essentially the same procedure as described above is carried out. The data for the exanded areas of the various conversion diagrams for the different values of V in the CIE system, an example of which is shown in Table 1, is stored in a computer memory along with the data for the known regions of the conversion diagrams, and the conversion can be carried out simply and speedily in accordance with a simple program.

The present invention thus provides a way to overcome the problem that, with the known conversion diagrams and data therefrom, it is impossible in practice to carry out conversion of values according to the CIE notation system into values according to the Munsell notation system.

When the expansion areas of the conversion diagrams and the data based therein are provided, values according to the Munsell notation system for all colors can be obtained reliably. Accordingly, the provision of the expanded areas and data based thereon make it possible to utilize the Munsell notation system values effectively for industrial purposes.

TABLE 1

| | | | | | | | V = 9, Yc (%) = 78.66 | | | | | |
| --- | --- | --- | --- | --- | --- | --- | --- | --- | --- | --- | --- | --- |
| | | 2.5 | | | 5.0 | | | 7.5 | | | 10.0 | |
| H | V/C | x | y | V/C | x | y | V/C | x | y | V/C | x | y |
| R | /8 | 0.3885 | 0.3187 | /8 | 0.3973 | 0.3286 | /8 | 0.4073 | 0.3413 | /8 | 0.4160 | 0.35296 |
| | /10 | 0.4105 | 0.3191 | /10 | 0.4242 | 0.3316 | /10 | 0.4334 | 0.3478 | /10 | 0.4440 | 0.36202 |
| YR | /8 | 0.4213 | 0.3678 | /8 | 0.4228 | 0.3809 | /10 | 0.4490 | 0.4097 | /10 | 0.4457 | 0.4261 |
| | /10 | 0.4499 | 0.3806 | /10 | 0.4508 | 0.3959 | /12 | 0.4760 | 0.4264 | /12 | 0.4715 | 0.4453 |
| Y | /14 | 0.4768 | 0.4685 | /22 | 0.4878 | 0.5135 | /20 | 0.4731 | 0.5272 | /20 | 0.4603 | 0.5415 |
| | /16 | 0.4967 | 0.4843 | /24 | 0.4926 | 0.5178 | /22 | 0.4799 | 0.5356 | /22 | 0.4666 | 0.5510 |
| GY | /20 | 0.4420 | 0.5633 | /20 | 0.4158 | 0.5857 | /20 | 0.3623 | 0.6186 | /20 | 0.2985 | 0.6056 |
| | /22 | 0.4486 | 0.5758 | /22 | 0.4208 | 0.6015 | /22 | 0.3644 | 0.6452 | /22 | 0.2938 | 0.6364 |
| G | /18 | 0.2549 | 0.5206 | /14 | 0.2417 | 0.4319 | /14 | 0.2293 | 0.4115 | /14 | 0.2193 | 0.3890 |
| | /20 | 0.2468 | 0.5446 | /16 | 0.2306 | 0.4478 | /16 | 0.2167 | 0.4245 | /16 | 0.2061 | 0.3984 |
| BG | /12 | 0.2255 | 0.3629 | /12 | 0.2165 | 0.3432 | /12 | 0.2069 | 0.3227 | /8 | 0.2302 | 0.3096 |
| | /14 | 0.2128 | 0.3690 | /14 | 0.2029 | 0.3459 | /14 | 0.1923 | 0.3228 | /10 | 0.2103 | 0.3074 |
| B | /6 | 0.2451 | 0.3021 | /6 | 0.2431 | 0.2908 | /6 | 0.2439 | 0.2835 | /6 | 0.2475 | 0.2772 |
| | /8 | 0.2222 | 0.2969 | /8 | 0.2187 | 0.2811 | /8 | 0.2190 | 0.2709 | /8 | 0.2238 | 0.2620 |
| PB | /4 | 0.2849 | 0.2963 | /4 | 0.2881 | 0.2951 | /4 | 0.2929 | 0.2941 | /6 | 0.2782 | 0.2646 |
| | /6 | 0.2723 | 0.2863 | /6 | 0.2771 | 0.2845 | /6 | 0.2843 | 0.2830 | /8 | 0.2654 | 0.2442 |
| P | /6 | 0.2876 | 0.2679 | /6 | 0.2939 | 0.2680 | /8 | 0.3123 | 0.2648 | /8 | 0.3260 | 0.2724 |
| | /8 | 0.2789 | 0.2493 | /8 | 0.2875 | 0.2490 | /10 | 0.3126 | 0.2508 | /10 | 0.3302 | 0.2603 |
| RP | /8 | 0.3410 | 0.2810 | /8 | 0.3561 | 0.2916 | /8 | 0.3674 | 0.3005 | /8 | 0.3780 | 0.3096 |

TABLE 1-continued

| | V = 9, Yc (%) = 78.66 | | | | | | | | | | |
|---|---|---|---|---|---|---|---|---|---|---|---|
| | 2.5 | | | 5.0 | | | 7.5 | | | 10.0 | | |
| H | V/C | x | y | V/C | x | y | V/C | x | y | V/C | x | y |
| | /10 | 0.3498 | 0.2710 | /10 | 0.3691 | 0.2844 | /10 | 0.3836 | 0.2958 | /10 | 0.3970 | 0.3074 |

I claim:

1. A method of expanding the regions in which conversion of color values in the CIE notation system to values in the Munsell notation system can be made, comprising the steps of:

on a conventional Munsell chromaticity diagram having equi-hue lines and equi-chroma loci and superimposed on a CIE set of coordinates in a conventional conversion diagram, extending the respective equi-hue lines outwardly from the outermost equichroma locus in a direction in alignment with respective lines connecting the respective intersections of the outermost equichroma locus with the respective equi-hue lines and the intersections of the next inward equi-chroma locus with the respective equi-hue lines, the extension being to points along the extended equi-hue lines which are integral multiples of a value d which is equal to $\sqrt{(x_1-x_2)^2+(y_1-y_2)}$ where $x_1$ and $y_1$ are the CIE notation values of the points of intersection of the respective equi-hue lines and the outermost equi-chroma locus, and $x_2$ and $y_2$ are the CIE notation values of the points of intersection of the respective equi-hue lines and the next inward equi-chroma locus; and joining the points along the extended equi-hue lines with corresponding points on adjacent equi-hue lines to form further equi-chroma loci outwardly of the said outermost equichroma locus.

* * * * *